(12) United States Patent
Lee

(10) Patent No.: US 7,362,028 B2
(45) Date of Patent: Apr. 22, 2008

(54) STATOR OF OUTER ROTOR TYPE MOTOR FOR DRUM TYPE WASHER

(75) Inventor: Woon Yong Lee, Gwangsan-gu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/048,754

(22) Filed: Feb. 3, 2005

(65) Prior Publication Data
US 2005/0189838 A1 Sep. 1, 2005

(30) Foreign Application Priority Data
Feb. 26, 2004 (KR) .................. 10-2004-0012999
Feb. 27, 2004 (KR) .................. 10-2004-0013267

(51) Int. Cl.
*H02K 1/06* (2006.01)
(52) U.S. Cl. ..................... 310/217; 310/216
(58) Field of Classification Search ........ 310/214–217, 310/194
See application file for complete search history.

(56) References Cited

U.S. PATENT DOCUMENTS

| | | | |
|---|---|---|---|
| 6,510,716 B1* | 1/2003 | Kim et al. ............... | 68/24 |
| 2001/0030484 A1* | 10/2001 | Nakamura ............... | 310/216 |
| 2002/0166912 A1* | 11/2002 | Schneid ................... | 241/298 |
| 2003/0006665 A1 | 1/2003 | Kim et al. | |
| 2003/0132675 A1* | 7/2003 | Kwon et al. ............. | 310/86 |
| 2004/0068857 A1* | 4/2004 | Park et al. ............... | 29/596 |
| 2004/0232789 A1* | 11/2004 | Lim et al. ................ | 310/91 |
| 2005/0073210 A1* | 4/2005 | Rocky et al. ............ | 310/216 |

FOREIGN PATENT DOCUMENTS

JP 01255452 A * 10/1989

* cited by examiner

*Primary Examiner*—Thanh Lam
(74) *Attorney, Agent, or Firm*—Birch, Stewart, Kolasch & Birch, LLP

(57) ABSTRACT

The present invention provides an outer rotor type motor for a drum type washing machine to reduce material and weight for fabrication, simplify fabrication process, provide stable assembly of a stator to a fixing side such as a tub or a bearing housing, prevent by assembly interference caused by a difference in the tips in assembling the upper and lower insulators the stator and enhancing loading efficiency of a cylindrical sleeve provided to inner circumference of fastening holes of the upper and lower insulators. The present invention includes a helical core having multiple layers formed by winding steel plates in a helix, the steel plate having a base portion with teeth projected from the base portion, an upper and lower insulators of an electric insulating material covered on upper and lower sides of the helical core in shapes complementary to shapes of the helical core, respectively, and at least three fastening portions formed as one body in each of the upper and lower insulators and projected from an inside of the helical core toward a center of the stator, wherein a boss forming a fastening hole for securing the stator to a tub wall with fastening members is provided, wherein a ridge portion, projected toward the confronting insulator, is provided to a vicinity of the boss, and wherein the ridge portions are pressed closely together in assembling the upper and lower insulators.

47 Claims, 8 Drawing Sheets

STATOR OF OUTER ROTOR TYPE MOTOR FOR DRUM TYPE WASHER

This application claims the benefit of the Korean Application No. P2004-13267 filed on Feb. 27, 2004 and P2004-12999 filed on Feb. 26, 2004 which are hereby incorporated by reference.

BACKGROUND OF THE INVENTION

1. Field of the Invention

The present invention relates to a drum type washing machine, and more particularly, to a stator of an outer rotor type BLDC motor, which is applicable to a direct coupling type drum type washing machine.

2. Discussion of the Related Art

Generally, a drum type washing machine performs washing operation with the aid of a drive force of a motor which spins a drum containing laundry, detergent, and water, to cause friction between laundry and water. The drum type washing machine causes almost no damage to the laundry, prevents tangling of the laundry, and brings about the effects of pounding and rubbing.

Drum type washing machines are categorized by an indirect coupling type and a direct coupling type according to a drive system. In the indirect coupling type, a drive force of a motor is indirectly transferred to a drum via a motor pulley and a belt wound to the drum pulley. In the direct coupling type, a rotor of a BLDC motor is directly coupled with a drum to directly transfer a drive force to the drum.

Yet, in the indirect coupling type system that transfers the drive force of the motor to the drum via the motor pulley and the belt wound on the drum pulley instead of transferring the drive force of the motor to the drum directly, energy loss occurs in the process of drive force transfer and considerable noise is generated.

Hence, the direct coupling drum type washing machine using the BLDC motor is widely used to solve the above problems of the drum type washing machine.

FIG. 1 is a cross-sectional diagram of a direct coupling drum type washing machine according to a related art.

Referring to FIG. 1, a tub 2 is provided within a cabinet 1, and a drum 3 is rotatably provided within the tub 2.

A motor is provided to a rear portion of the tub 2. Specifically, a stator 6 is fixed to a rear wall of the tub 2 and a rotor 5 encloses the stator 6 to be coupled to the drum 3 via a shaft.

A door 21 is provided to a front portion of the cabinet 1 and a gasket is provided between the door 21 and the tub 2.

A hanging spring 23 supporting the tub 2 is provided between an inside of a top portion of the cabinet 1 and an upper outer circumference of the tub 2, and a friction damper 24 is provided between an inside of a bottom portion of the cabinet 1 and a lower outer circumference of the tub 2 to attenuate vibration of the tub 2.

FIG. 2 is a perspective diagram of a stator in FIG. 1 and FIG. 3 is a perspective diagram of a sectional core (SC) applied to the stator in FIG. 2.

A method of manufacturing a stator core according to a related art is explained as follows.

First of all, a plurality of unit cores are fabricated by a pressing process of a steel plate. In doing so, each of the unit cores consists of teeth 151, a base 150, and a protrusion 500 opposite to the teeth 151 for forming a fastening hole 500a. A plurality of the unit cores are stacked to form a plurality of assemblies. And, a plurality of the assemblies are linked in a circumferential direction to complete a stator core that is so-called a stator core.

The protrusion 500 plays a role in standing a fastening force of a bolt as well as provides the fastening hole 500a necessary for securing a stator to the rear wall of the tub.

Yet, such a method of manufacturing the stator 6 with the sectional core SC is very complicated and brings about considerable loss of materials.

Meanwhile, a helical core, which is manufactured by helically stacking a steel plate consisting of teeth 151 and a base 150, is very useful in reducing the loss of materials and simplifying the manufacturing process. Yet, in manufacturing the helical core HC, the steel plate blanked like a strap needs to be helically bent. Hence, it is unable to provide a protrusion for coupling a stator with a tub to an inside of the core.

If the protrusion 500 is provided to the inside of the core in manufacturing the helical core HC, a core width of a part reserved for the protrusion is too large to bend the core.

Accordingly, a stator structure that enables the same role of the protrusion of the sectional core to be performed not by the core itself but by another portion is needed to be applicable to the helical core HC.

Meanwhile, it is important to sufficiently secure the rigidity of the protrusion provided with the fastening hole for securing the stator to the tub, which is explained as follows.

First of all, in a washing machine that rotates a drum directly using a BLDC motor, a stator is directly assembled to a fixing side of a rear portion of the tub. If the stator of a motor for a high capacity drum type washing machine weighs over 1.5 kg and if a dewatering rotational speed is 600~2,000 RPM, a fastening portion of the stator 6 is broken due to the stator weight, the vibration of the high rotation, and the shake and transformation of the rotor 5.

Specifically, in case that the stator is coupled with the rear wall of the tub of the drum type washing machine using the BLDC motor, a radial direction of the stator almost maintains parallel to a ground, the breakage of the fastening portion of the stator 6 to the rear wall of the tub gets worsened due to the vibration occurring on driving the washing machine.

Therefore, it is important to sufficiently secure the rigidity of the protrusion provided with the fastening hole for securing the stator 6 to the tub.

SUMMARY OF THE INVENTION

Accordingly, the present invention is directed to a stator of an outer rotor type motor for a drum type washing machine that substantially obviate one or more problems due to limitations and disadvantages of the related art.

An object of the present invention is to provide an outer rotor type motor for a drum type washing machine, by which a material and weight for fabrication are reduced, by which a fabrication process is simplified, and by which a stator can be stably assembled to a fixing side such as a tub or a bearing housing.

Another object of the present invention is to provide a stator of an outer rotor type motor for a drum type washing machine, in which a stator can be stably assembled to a fixing side such as a tub or a bearing housing and by which the stator weighing at least 1.5 kg is applicable to a drum type washing machine BLDC motor having a rotational speed over 2,000 RPM.

A further object of the present invention is to provide a stator, by which an assembly interference caused by a difference in the tips in assembling the upper and lower insulators of the stator is prevented and by which loading efficiency of a cylindrical sleeve provided to inner circumference of fastening holes of the upper and lower insulators is enhanced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stator of an outer rotor type motor for a drum type washing machine according to the present invention includes a helical core having multiple layers formed by winding steel plates in a helix starting from a bottom layer to a top layer, the steel plate having a base portion with teeth projected from the base portion, an upper insulator of an electric insulating material covered on an upper side of the helical core in a shape complementary to a shape of the helical core, a lower insulator of an electric insulating material covered on a lower side of the helical core at the time of assembly with the upper insulator having a shape complementary to a shape of a helical core, and at least three fastening portions formed as one body in each of the upper and lower insulators and projected from an inside of the helical core toward a center of the stator for fastening the stator to a fixing side of a tub, wherein a boss forming a fastening hole for securing the stator to a tub wall with fastening members is provided, wherein a ridge portion, projected toward the confronting insulator, is provided to a vicinity of the boss on each assembled side of the upper and lower insulators, and wherein the ridge portions are pressed closely together in assembling the upper and lower insulators to enhance assembly efficiency of the upper and lower insulators.

In another aspect of the present invention, a stator of an outer rotor type motor for a drum type washing machine comprises a helical core having multiple layers formed by winding steel plates in a helix starting from a bottom layer to a top layer, the steel plate having a base portion with teeth projected from the base portion, an upper insulator of an electric insulating material covered on an upper side of the helical core in a shape complementary to a shape of the helical core, a lower insulator of an electric insulating material covered on a lower side of the helical core at the time of assembly with the upper insulator having a shape complementary to a shape of a stator core, at least three fastening portions formed as one body in each of the upper and lower insulators and projected which projects from an inside of the helical core toward a center of the stator for fastening the stator to a fixing side of a tub, wherein a boss forming a fastening hole for securing the stator to a tub wall with fastening members is provided, and wherein at least one fastening projection is provided at an inner circumference of the fastening hole of the boss to prevent a separation of a cylindrical sleeve in the fastening hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiments of the present invention are explained with reference to FIGS. 4 to 9 as follows.

First of all, one embodiment of the present invention is explained with reference to FIGS. 4 to 6 as follows.

Figure 1:
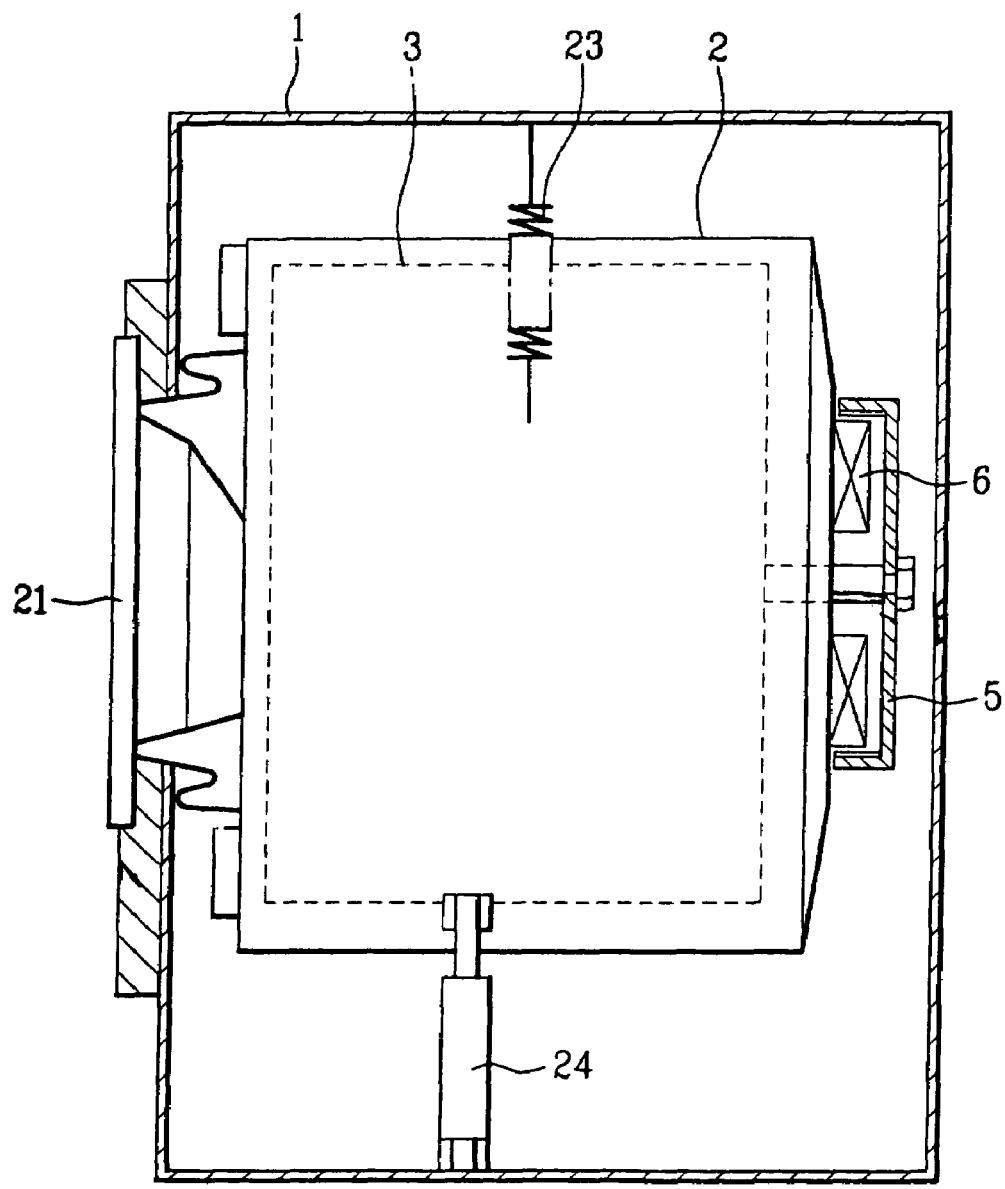
FIG. 1 is a cross-sectional diagram of a direct coupling drum type washing machine according to a related art.
Figure 2:
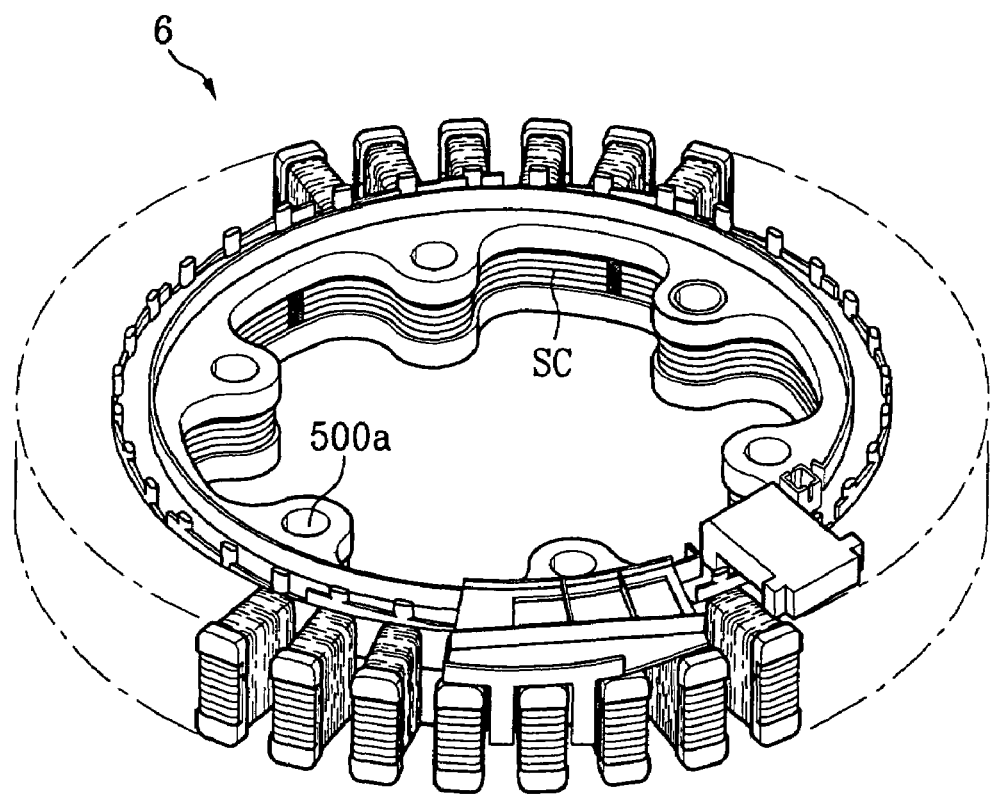
FIG. 2 is a perspective diagram of a stator in FIG. 1.
Figure 3:
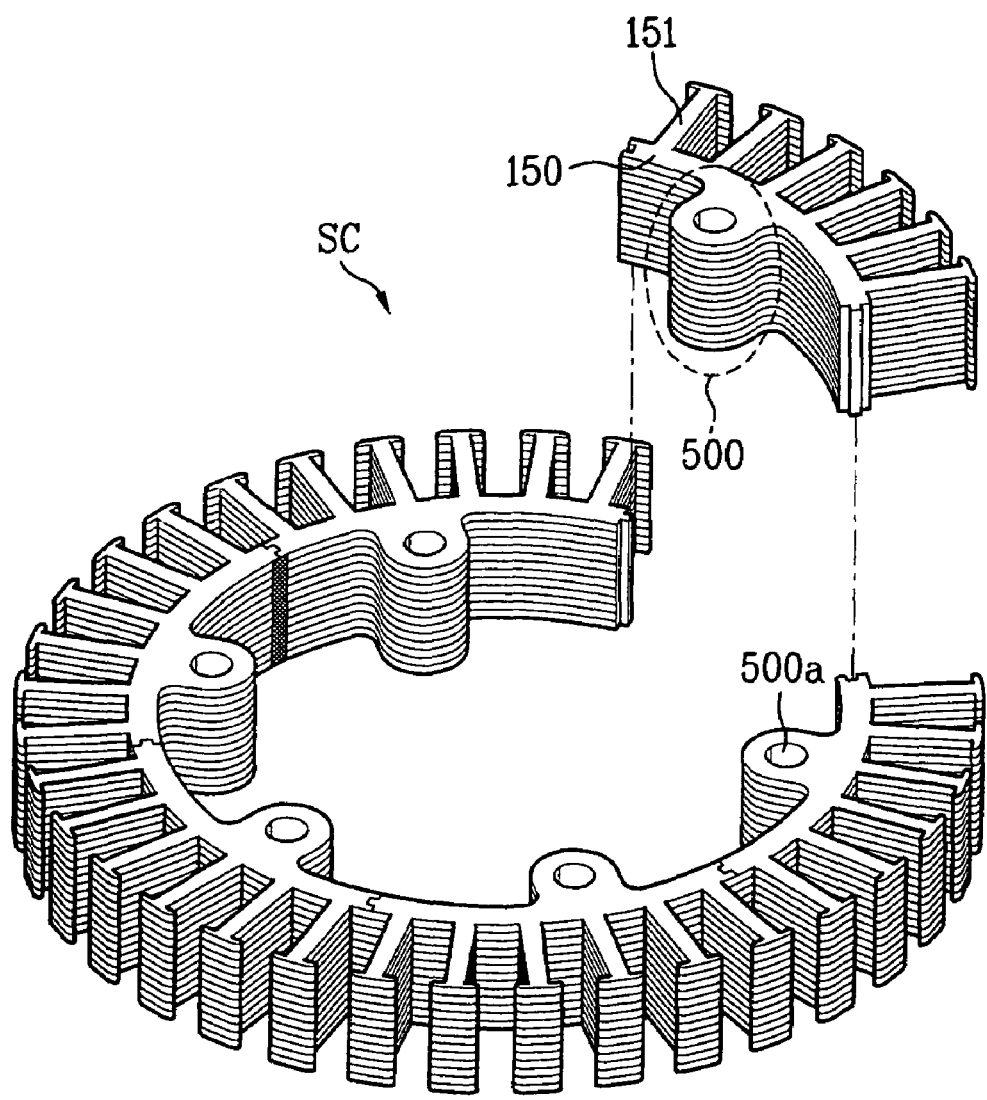
FIG. 3 is a perspective diagram of a sectional core (SC) applied to the stator in FIG. 2.
Figure 4:
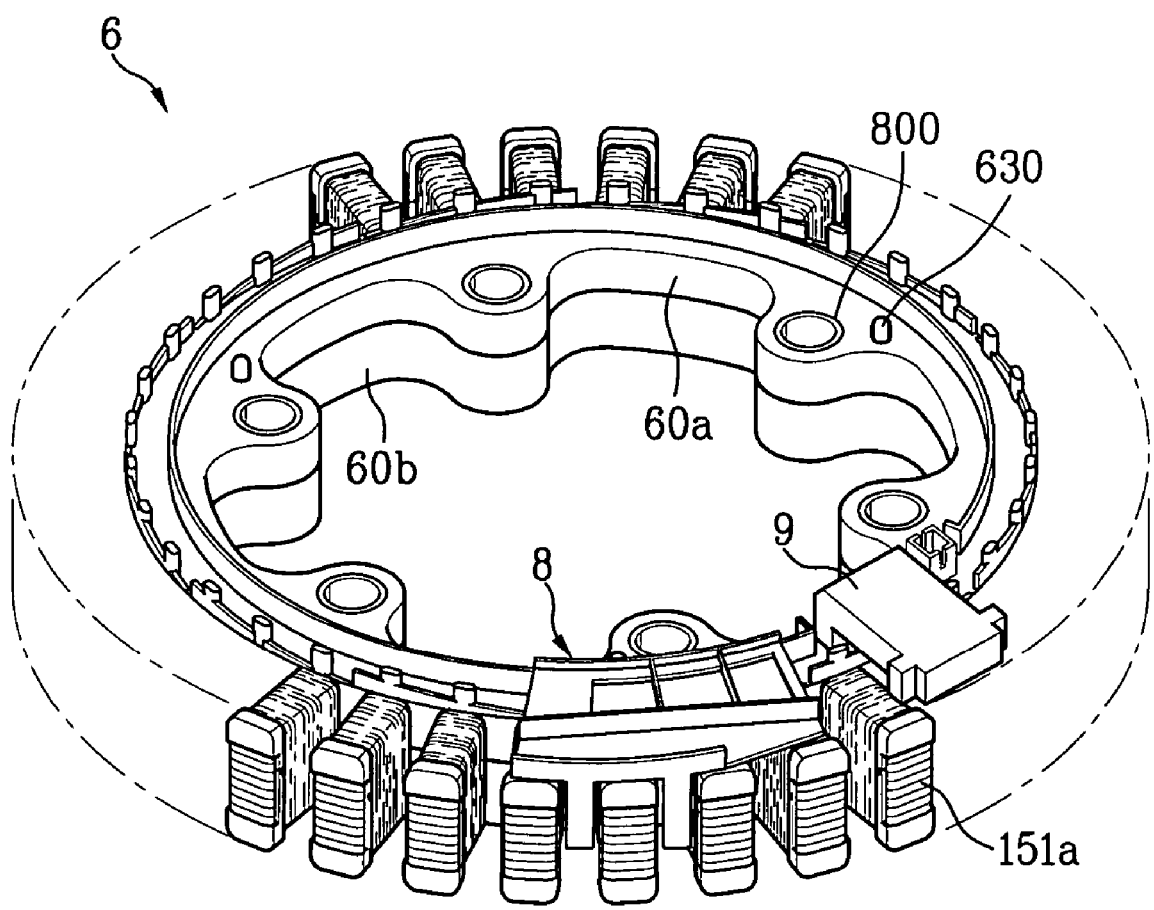
FIG. 4 is a perspective diagram of a stator according to the present invention.
Figure 5:
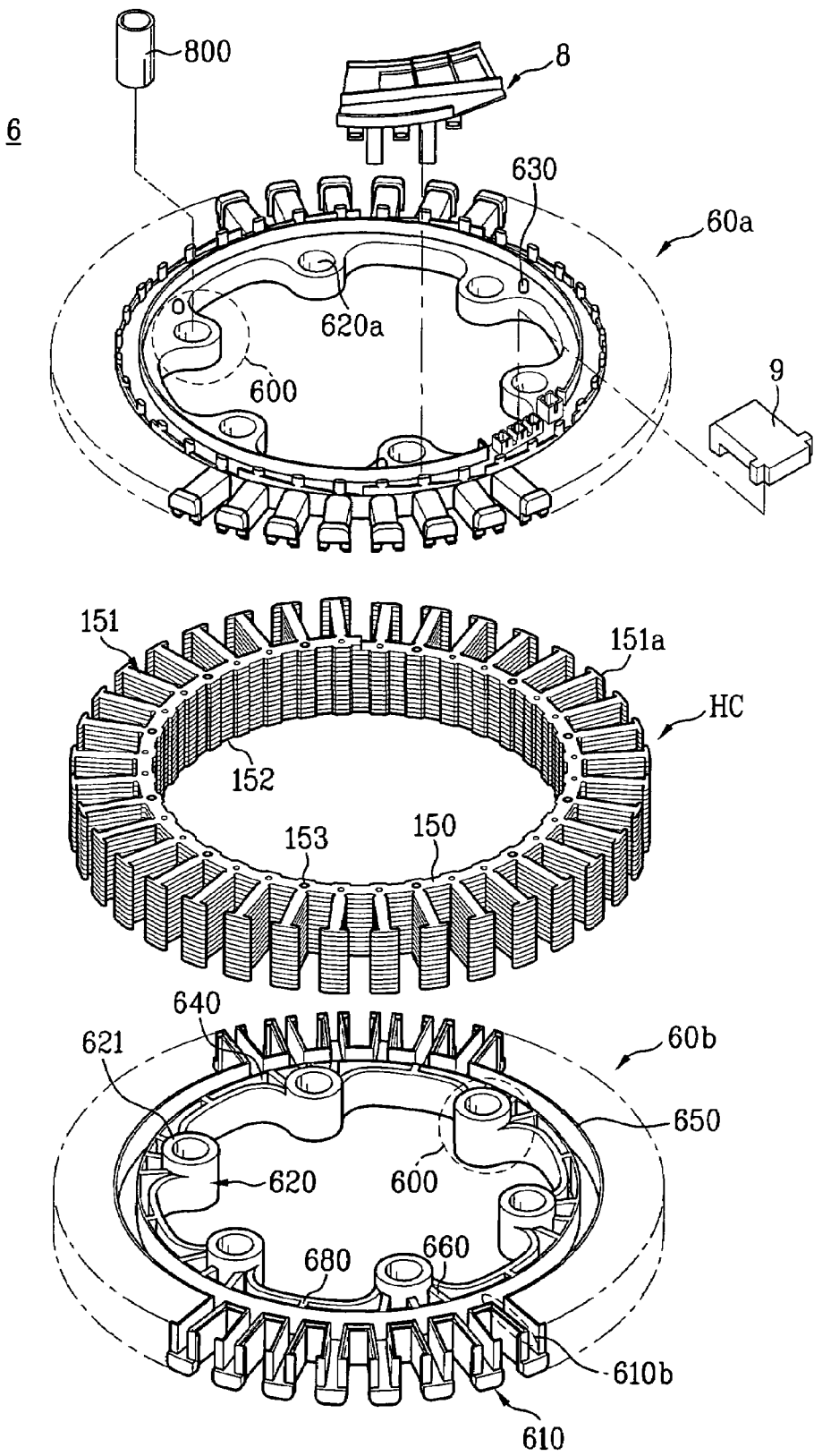
FIG. 5 is a projected perspective diagram of the stator in FIG. 4.
Figure 6:
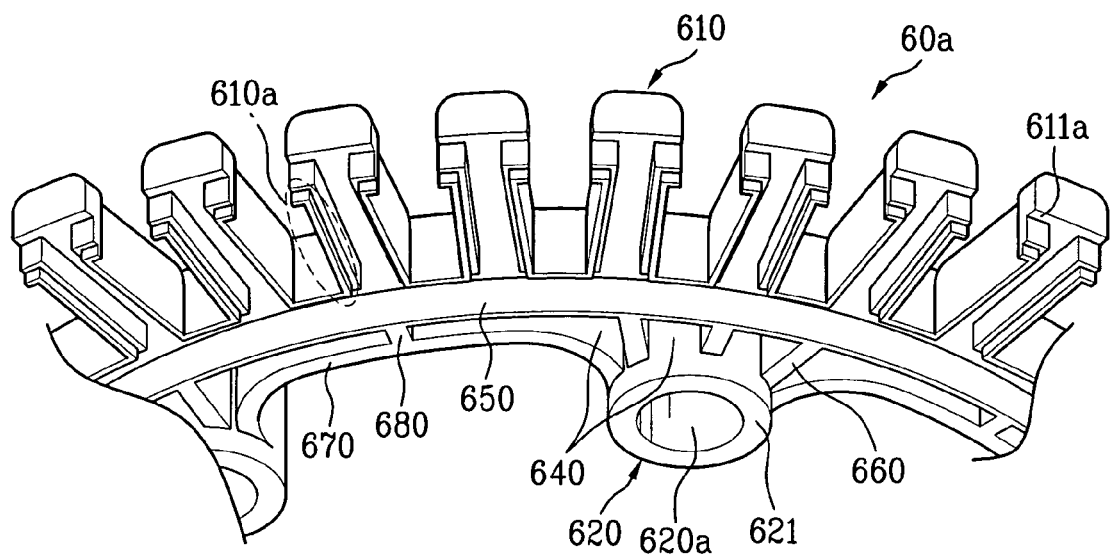
FIG. 6 is a perspective diagram of a backside of an upper insulator in FIG. 5.

FIG. 4 is a perspective diagram of a stator according to the present invention, FIG. 5 is a projected perspective diagram of the stator in FIG. 4, and FIG. 6 is a perspective diagram of a backside of an upper insulator in FIG. 5.

Referring to FIGS. 4 to 6, a stator 6 of an outer rotor type motor according to one embodiment of the present invention comprises a helical core HC having multiple layers formed by winding steel plates in a helix starting from a bottom layer to a top layer, the steel plate having a base portion 150 with teeth 151 projected from the base portion 150, an upper insulator 60a of an electric insulating material covered on an upper side of the helical core HC in a shape complementary to a shape of the helical core HC, a lower insulator 60b of an electric insulating material covered on a lower side of the helical core HC at the time of assembly with the upper insulator 60a having a shape complementary to a shape of a helical core HC, and at least three fastening portions 600 formed as one body in each of the upper and lower insulators 60a and 60b and projected from an inside of the helical core HC toward a center of the stator 6 for fastening the stator 6 to a fixing side of a tub.

A fastening portion 600, as shown in FIG. 5, has a fastening hole 620a for securing the stator 6 to a fixing side, such as a tub, with a fastening member. The fastening hole 620a is formed by a boss 620 projected to the back side of the fastening portion 600.

Furthermore, ridges 621 are provided to a vicinity of the bosses 620 on each assembled side of the upper and lower insulators 60a and 60b and are projected toward the confronting insulator, respectively. The ridges 621 are pressed closely together in assembling the upper and lower insulators 60a and 60b, thereby enhancing assembly efficiency of the upper and lower insulators 60a and 60b.

A support rib 650 is provided on an inside along a circumferential direction thereof in contact with the helical core for supporting an inside surface of the helical core HC in each of the upper insulator 60a and lower insulator 60b.

Furthermore, the fastening portion 600 of each of the upper insulator 60a and the lower insulator 60b includes at least one reinforcing rib 660 connected between the boss 620 of the fastening hole 620a and the supporting rib 650 for spreading fastening force concentrated on the boss 620 and reinforcing a strength of the fastening portion 600.

Figure 7:
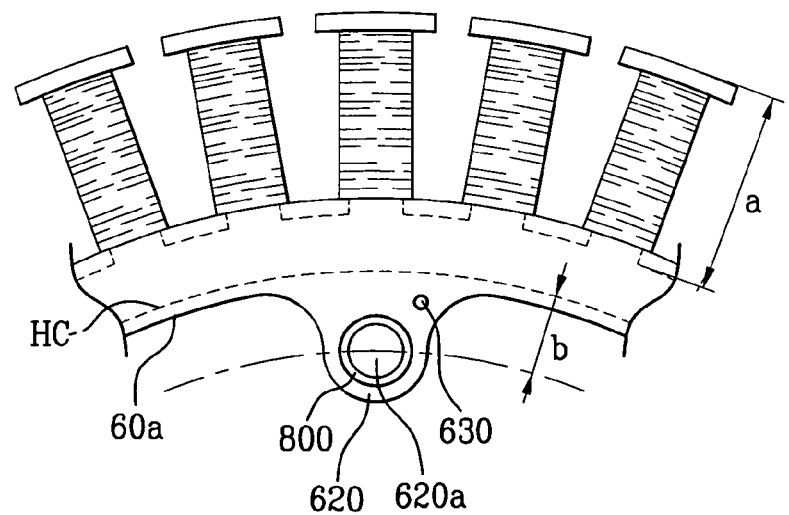
FIG. 7 is a layout of the stator in FIG. 4.

As shown in FIG. 7, the fastening portion 600 of each of the upper insulator 60a and the lower insulator 60b has a reinforcing rib 670 at an inside circumference thereof, and at least one connection rib 680 connected between the reinforcing rib 670 and the supporting rib 650 which supports an inside surface of the core in a radial direction, for providing a supporting force.

Each of the upper insulator 60a and the lower insulator 60b has tips 610a on opposite sidewalls of each of the teeth 610 thereof having shapes in complementary to each other for fitting in at the time of assembly to form a flush surface.

In this case, if one of the tips 610a and 610b has a ']' shape, the other has a '[' shape.

At the opposite end surfaces substantially perpendicular to the opposite sidewall surfaces of the teeth 610 of the upper insulator 60a and the lower insulator 60b, there are tips 610a and 610b having shapes in complementary to each other. Hence, the further-provided tips 610a and 610b engage with each other in assembling the upper and lower insulators 60a and 60b.

The teeth 610 of each of the upper insulator 60a and the lower insulator 60b has a seating surface 611a at an end for seating a core shoe 151a of the helical core HC.

Along with this, in the vicinity of the fastening hole 620a of the fastening portion 600 of the upper insulator 60a, there is a positioning projection 630 having a shape in complementary to a positioning hole or a slot (not shown) in the fixing side of the tub.

Moreover, there is a cylindrical sleeve 800 in the fastening hole 620a, a spring pin having an elasticity owing to an incised portion, or a hollow pin enabling press fit in the fastening hole 620a, serves as a bushing.

A plurality of recesses 152 are provided to the base portion 150 of the helical core HC to facilitate a winding work for core formation by reducing stress. Moreover, the helical core HC is fastened by rivets 153 passed through pass through holes in the base portion 150.

A winding beginning portion or a bottom layer of the helical core HC and a winding end portion or a top layer of the helical core HC can be welded to predetermined contact portions of the base portion 150.

Referring to FIG. 7, the stator 6 according to the present invention includes at least three fastening portions 600 formed as one body in each of the upper insulator 60a and the lower insulator 60b which projects from an inside of the helical core toward a center of the stator for fastening the stator to a fixing side of a tub.

If a length of each of the teeth 151 projected from a lateral outside of the helical core HC is set to 'a' and if a distance from a lateral inside of the helical core to a center of the fastening hole of the fastening portion 600 is set to 'b', the fastening portion 600 is formed to meet a definition of 'a≧b'.

Meanwhile, a reference number '8' in FIG. 5 indicates a hole sensor assembly for a motor control and a reference number '9' indicates a tap housing assembly for power connection to supply power to the stator side.

An operation of the above-configured present invention is explained as follows.

First of all, the helical core, which is formed in a manner of helically rotating to stack the steel plate including the teeth 151 and the base 150, is used as the core 15 configuring the stator. Hence, the present invention does not need the processes of assembling and welding unit cores for the sectional core, thereby simplifying the fabricating process.

And, the helical core HC according to the present invention has not the protrusions of the sectional core, thereby reducing the material loss.

Namely, the method of fabricating the stator according to the present invention is simple and reduces the material loss.

Moreover, the ridges 621 are provided to vicinities of the bosses 620 at assembled sides of the upper and lower insulators 60a and 60b and are projected toward the confronting insulator, respectively. The upper and lower insulators 60a and 60b are assembled to each other by contacting the ridges 621 of the boss side of the upper insulator 60a with those of the lower insulator 60, respectively, whereby assembly efficiency of the upper and lower insulators 60a and 60b is enhanced.

Namely, if the ridges 621 are not provided, by a height difference, i.e., difference in the tips, between the tips 610a or 610b provided to an outer circumference of the upper or lower insulator 60a or 60b and a surface of the corresponding boss 620 provided to an inner circumference of the upper or lower insulator 60a or 60b, the tips 610a and 610 initially come into contact with each other in assembling the upper and lower insulators 60a and 60b. Hence, the upper or lower insulators 60a and 60b are assembled together while the bosses 620 of the upper and lower insulators 60a and 60b are separated from each other.

Thus, the assembly is carried out without the contact between the bosses 620 of the upper and lower insulators 60a and 60b. Hence, transformation due to the bending or distortion may occur in the area of the upper or lower insulator 60a or 60b provided with the bosses 620 in case that a shock, vibration, or the like is applied to the assembled upper insulator 60a and/or the lower insulator 60b.

To overcome such a problem, the ridges 621 are provided to the vicinities of the bosses 620 to enable the assembly of the upper and lower insulators 60a and 60b by making the confronting ridges 621 press closely to each other. Hence, the assembly efficiency of the assembled sides of the upper and lower insulators 60a and 60b can be enhanced to prevent the transformations of the upper and lower insulators 60a and 60b which are caused by the difference in the tips.

Moreover, the stator 6 of the present invention has sufficient rigidity against the fastening force of the bolt in a manner of improving the structure of the upper and lower insulators 60a and 60b without forming the protrusion for standing the fastening force in fixing the stator 6 to the core itself.

That is, by providing structures that work the same with the projected portion of the division core to the fastening portions 600 of the upper insulator 60a and the lower insulator 60b, a stator 6 can be provided, to which the helical core HC is applicable.

Moreover, spaces 640 between the ribs 650, 660, 670, and 680 at a back side of the fastening portion 600 dampen and attenuate vibration occurred during driving the motor, to improve mechanical reliability of the stator 6, and contributes to the reduction of the insulator material.

The supporting ribs 650 of the upper insulator 60a and the lower insulator 60b formed at an inside in contact with the helical core HC along the circumferential direction support an inside of the helical core HC.

The reinforcing rib 660 connected between the boss 620 of the fastening hole 620a and the supporting rib 650 at each of the fastening portion 600 of the upper insulator 60a and the lower insulator 60b spread the fastening force concentrated on the boss 620, and reinforces a strength of the fastening portion 600.

According to this, the stator 6 can effectively prevent a fastening portion of the stator 6 suffering from breakage caused by vibration at the spinning, shaking and deformation of the rotor 5 even at a large capacity drum type washing machine having a weight over 1.5 kg only of the stator, and a spinning speed ranging 600~2,000 RPM.

As a positioning projection 630 in the vicinity of the fastening hole 620a of the fastening portion 600 fits in a positioning hole (not shown) in the tub 2, fastening of the stator is easy.

Hence, the location setting projection 630 facilitates the stator 6 according to the present invention to be coupled with the tub 2, whereby a maintenance and repair work of a serviceman can be easily done for after-service.

Alternatively, it is a matter of course that the positioning projection 630 may be formed on the tub 2, and the positioning hole may be formed in the fastening portion 600.

Figure 8A:
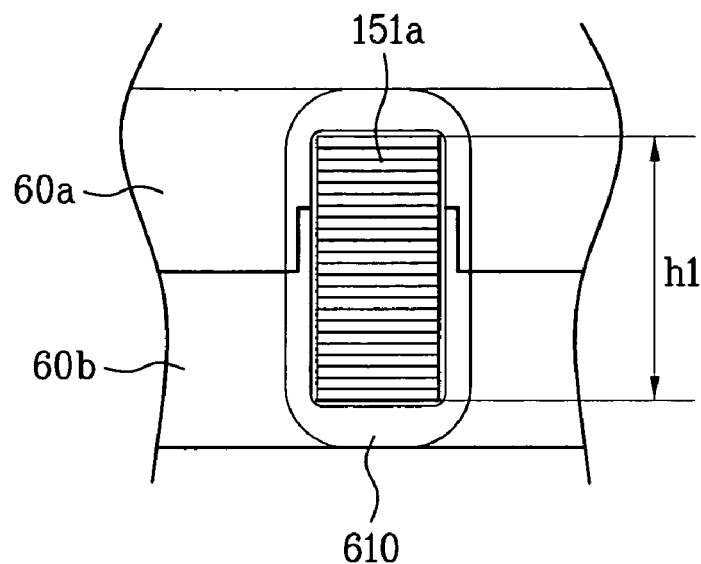
FIG. 8A and FIG. 8B are front diagrams of an insulator for common use.
Figure 8B:
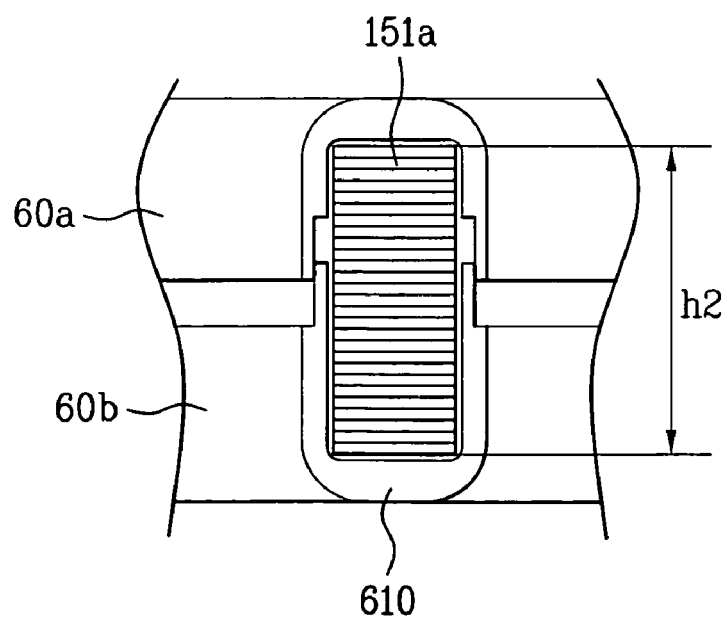

FIG. 8A and FIG. 8B are reference drawings, illustrating a versatility of application of the insulators, wherein it can be noted that the upper and lower insulators 60a and 60b, respectively, are applicable even if a total height of the helical core varies within a certain range.

FIG. 8A, a stacked height h1 of the core corresponds to a height in case that the stepped portions 610a and 610b of the upper and lower insulators 60a and 60b completely engage with each other.

That is, FIG. 8a illustrates a case when a total height h1 of the core is a height which permits tips 610a and 610b of the upper and lower insulators 60a and 60b fit exactly. FIG. 9b illustrates a case when a total height of the core is a height greater than a case of FIG. 9a such that the tips 610a and 610b of the upper and lower insulators 60a and 60b are unable to fit exactly, but spaced a certain distance.

Even if the total height h2 of the core is greater than a height that permits the tips 610a and 610b of the upper and lower insulators 60a and 60b, respectively, fit exactly, such that there is a space between the tips 610a and 610b, because the insulation against the core teeth is still achievable; the upper and lower insulators 60a and 60b are applicable to the case of FIG. 8b, too.

Thus, since the separate type upper and lower insulators of the embodiment are applicable to the core regardless of the total height of the core within a certain range of the total height, the separate type upper and lower type insulators of the embodiment can improve workability on an assembly line.

Figure 9:
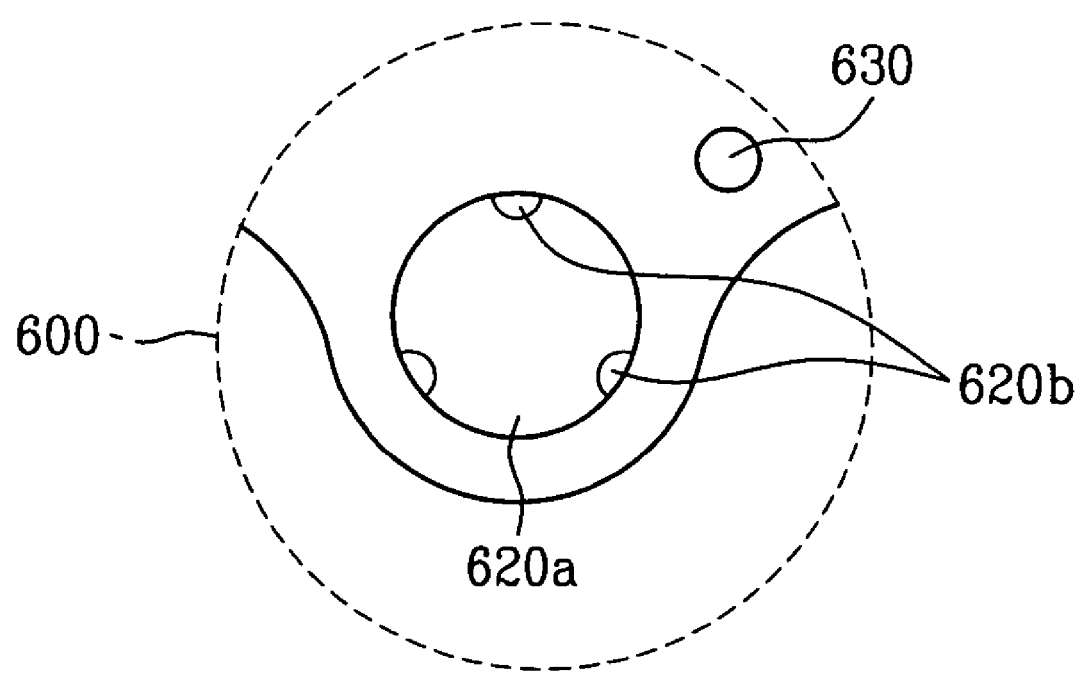
FIG. 9 is a layout of a fastening member of a stator according to another embodiment of the present invention.

FIG. 9 is a layout of a fastening portion of a stator according to another embodiment of the present invention.

Referring to FIG. 9, a fastening portion of a stator according to another embodiment of the present invention has the same configuration of that of the stator according to the former embodiment of the present invention except but differs only in having at least one fastening projection 620b provided at an inner circumference of the fastening hole of the boss to prevent a separation of the cylindrical sleeve 800 in the fastening hole.

Namely, to prevent the separation of the cylindrical sleeve 800 installed in the fastening hole 620a, the fastening projection 620b is provided to the inner circumference of the fastening hole 620a.

Preferably, a plurality of the fastening projections 620b are provided at the inner circumference of the fastening hole 620a along a circumferential direction.

Moreover, a length of the fastening projection 620b is set equal to or smaller than a depth of the fastening hole 620a of the boss 620a.

Preferably, a cross-section of the fastening projection 620b is semicircular in shape. Yet, the cross-section of the fastening projection 620b may be oval or can be variously modified.

An operation of another embodiment of the present invention is explained as follows.

First of all, the present embodiment basically has the same operation of the former embodiment but differs in having the following operation of the fastening projection 620b.

Namely, the fastening projection 620b, which is provided to the fastening hole 620a of each of the upper and lower insulators 60a and 60b, pressurizes an outer circumference of the cylindrical sleeve 800 inserted in the fastening hole 620a, thereby preventing the cylindrical sleeve 800 from escaping from the fastening hole 620a.

Therefore, a secure assembly of the cylindrical sleeve can be achieved.

Accordingly, the present invention provides the following effects or advantages.

First of all, the material and weight for fabrication of the stator of the BLDC motor for the drum type washing machine are reduced, the fabrication process is simplified, and the stator can be stably assembled to the fixing side such as a tub.

Specifically, the stator can be stably assembled to the fixing side such as a tub or a bearing housing like the case of applying the sectional core, whereby the stator weighing at least 1.5 kg is applicable to a drum type washing machine BLDC motor having a rotational speed over 2,000 RPM.

Secondly, the stator is facilitated to be assembled to the tub, whereby a maintenance and repair work of a serviceman can be easily done for after-service.

Thirdly, the present invention enhances the assembly efficiency of the upper and lower insulators to raise the rigidity of the stator, thereby enhancing the mechanical reliability and endurance by reducing the noise and vibration.

Finally, by installing the cylindrical sleeve playing a role of the bushing in the fastening hole of upper or lower insulator securely, the present invention raises the rigidity of the stator to reduce the noise and vibration thereof, thereby enhancing the mechanical reliability and endurance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stator of an outer rotor motor for a drum washing machine, comprising:
   a core having multiple layers, the core having a base portion with teeth projecting from the base portion;

an upper insulator of an electric insulating material covering an upper side of the core in a shape complementary to a shape of the core;
a lower insulator of an electric insulating material covering a lower side of the core in a shape complementary to the shape of the core; and
a plurality of fastening portions formed at each of the upper and lower insulators projecting from an inner side of each of the upper and lower insulators the core toward a center of the stator for fastening the stator to a tub, each of the plurality of the fastening portions including a boss having a ridge,
wherein the boss has a fastening hole for securing the stator to a tub wall with fastening members, and extends toward a confronting insulator from each of the fastening portions,
wherein the ridge projects toward the confronting insulator from the boss, and
wherein the confronting ridges are in contact with each other.

2. The stator of claim 1, wherein each of the upper insulator and the lower insulator includes a supporting rib on an inside along a circumferential direction thereof in contact with the core for supporting an inside surface of the core.

3. The stator of claim 2, wherein the fastening portion of each of the upper insulator and the lower insulator includes at least one reinforcing rib connected between the boss of the fastening hole and the supporting rib for spreading fastening force concentrated on the boss and reinforcing a strength of the fastening portion.

4. The stator of claim 1, wherein each of the upper insulator and the lower insulator includes tips on opposite sidewalls of each of the teeth thereof having shapes in complementary to each other for fitting in at the time of assembly to form a flush surface.

5. The stator of claim 4, wherein the tips on opposite sidewalls of each of the teeth include '⌊' shape if the other side of the upper, and lower insulators includes a '⌉' shape.

6. The stator of claim 1, further comprising tips having shape in complementary to each other at opposite end surfaces substantially perpendicular to opposite sidewall surfaces of the teeth of the upper insulator and the lower insulator.

7. The stator of claim 1, wherein each of the teeth of the upper insulator and the lower insulator includes a seating surface at an end for seating a core shoe of the core.

8. The stator of claim 1, wherein the insulator includes a positioning projection in the vicinity of the fastening hole thereof having a shape in complementary to a positioning hole or a slot on the tub.

9. The stator of claim 1, further comprising a cylindrical sleeve on an inside of the fastening hole.

10. The stator of claim 9, wherein the cylindrical sleeve is a spring pin having elasticity owing to a portion incised along a length direction of an outside surface.

11. The stator of claim 9, wherein the cylindrical sleeve is a hollow pin press fit in the fastening hole, the cylindrical sleeve having no incised portion.

12. The stator of claim 1, wherein the base portion of the core includes slots for reducing stress during winding the core.

13. The stator of claim 1, wherein the multiple layers are fastened by rivets passed through pass through holes in the base portion.

14. The stator of claim 1, wherein the bottom layer and the top layer of the core are welded to predetermined portions of the base portion, respectively.

15. The stator of claim 1, wherein if a length of each of the teeth projected from a lateral outside of the core is set to 'a' and if a distance from a lateral inside of the core to a center of a fastening hole of a fastening portion is set to 'b', 'a' is equal to or greater than 'b' ($a \geq b$).

16. A stator of an outer rotor motor for a drum washing machine, comprising:
a core having multiple layers, the core having a base portion with teeth projecting from the base portion;
an upper insulator of an electric insulating material covering an upper side of the core in a shape complementary to a shape of the core;
a lower insulator of an electric insulating material covering a lower side of the core in a shape complementary to the shape of the core; and
a plurality of fastening portions formed at each of the upper and lower insulators projecting from an inner side of each of the upper and lower insulators toward a center of the stator for fastening the stator to a tub, each of the plurality of the fastening portions including a boss having a ridge and at least one fastening projection,
wherein the boss has a fastening hole for securing the stator to a tub wall with fastening members, and extends toward a confronting insulator from each of the fastening portions,
wherein the at least one fastening projection is formed on an inner circumferential surface of the boss to prevent a separation of a cylindrical sleeve in the fastening hole.

17. The stator of claim 16, wherein a plurality of the fastening projections are provided on an inside along a circumferential direction of the fastening hole at predetermined distances from each other.

18. The stator of claim 16, wherein a projected shape of each of the at least one fastening projections has a hemispherical shape.

19. The stator of claim 16, wherein each of the upper insulator and the lower insulator includes a supporting rib on an inside along a circumferential direction thereof in contact with the core for supporting an inside surface of the core.

20. The stator of claim 19, wherein the fastening portion of each of the upper insulator and the lower insulator includes at least one reinforcing rib connected between the boss of the fastening hole and the supporting rib for spreading fastening force concentrated on the boss and reinforcing a strength of the fastening portion.

21. The stator of claim 16, wherein each of the upper insulator and the lower insulator includes tips on opposite sidewalls of each of the teeth thereof having shapes in complementary to each other for fitting in at the time of assembly to form a flush surface.

22. The stator of claim 21, wherein the tips on opposite sidewalls of each of the teeth include '⌊' shape if the other side of the upper, and lower insulators includes a '⌉' shape.

23. The stator of claim 16, further comprising tips having shape in complementary to each other at opposite end surfaces substantially perpendicular to opposite sidewall surfaces of the teeth of the upper insulator and the lower insulator.

24. The stator of claim 16, wherein each of the teeth of the upper insulator and the lower insulator includes a seating surface at an end for seating a core shoe of the core.

25. The stator of claim 16, wherein the insulator includes a positioning projection in the vicinity of the fastening hole thereof having a shape in complementary to a positioning hole or a slot on the tub.

26. The stator of claim 16, wherein the cylindrical sleeve is a spring pin having elasticity owing to a portion incised along a length direction of an outside surface.

27. The stator of claim 16, wherein the cylindrical sleeve is a hollow pin press fit in the fastening hole, the cylindrical sleeve having no incised portion.

28. The stator of claim 16, wherein at least one recess is provided to the base of the core to reduce stress in winding the core.

29. The stator of claim 16, wherein the multiple layers are fastened by rivets passed through pass through holes in the base portion.

30. The stator of claim 16, wherein the bottom layer and the top layer of the core are welded to predetermined portions of the base portion, respectively.

31. The stator of claim 16, wherein if a length of each of the teeth projected from a lateral outside of the core is set to 'a' and if a distance from a lateral inside of the core to a center of a fastening hole of a fastening portion is set to 'b', 'a' is equal to or greater than 'b' (a≧b).

32. A stator of an outer rotor motor for a drum washing machine, comprising:
   a core having multiple layers, the core having a base portion with teeth projecting from the base portion;
   an upper insulator of an electric insulating material covering an upper side of the core in a shape complementary to a shape of the core;
   a lower insulator of an electric insulating material covering a lower side of the core in a shape complementary to the shape of the core; and
   a plurality of fastening portions formed at each of the upper and lower insulators projecting from an inner side of each of the upper and lower insulators toward a center of the stator for fastening the stator to a tub, each of the plurality of the fastening portions including a boss having a ridge and at least one fastening projection,
   wherein the boss has a fastening hole for securing the stator to a tub wall with fastening members is provided to the fastening portion, and extends toward a confronting insulator from each of the fastening portions,
   wherein the ridge projects toward the confronting insulator from the boss,
   wherein the confronting ridges are in contact with each other, and
   wherein the at least one fastening projection is formed on an inner circumferential surface of the boss to prevent a separation of a cylindrical sleeve in the fastening hole.

33. The stator of claim 32, wherein each of the upper insulator and the lower insulator includes a supporting rib on an inside along a circumferential direction thereof in contact with the core for supporting an inside surface of the core.

34. The stator of claim 33, wherein the fastening portion of each of the upper insulator and the lower insulator includes at least one reinforcing rib connected between the boss of the fastening hole and the supporting rib for spreading fastening force concentrated on the boss and reinforcing a strength of the fastening portion.

35. The stator of claim 32, wherein each of the upper insulator and the lower insulator includes tips on opposite sidewalls of each of the teeth thereof having shapes in complementary to each other for fitting in at the time of assembly to form a flush surface.

36. The stator of claim 35, wherein the tips on opposite sidewalls of each of the teeth include '⌊' shape if the other side of the upper, and lower insulators includes a '⌉' shape.

37. The stator of claim 32, wherein a plurality of the fastening projections are provided on an inside along a circumferential direction of the fastening hole at predetermined distances from each other.

38. The stator of claim 37, wherein a projected shape of each of the at least one fastening projections has a hemispherical shape.

39. The stator of claim 37, wherein a length of each of the at least one fastening projection is equal to or smaller than a depth of the fastening hole of the corresponding boss.

40. The stator of claim 1, wherein the core is a helical core.

41. The stator of claim 16, wherein the core is a helical core.

42. The stator of claim 32, wherein the core is a helical core.

43. The stator of claim 1, wherein the stator is fastened to the tub only by the plurality of the fastening portions.

44. The stator of claim 16, wherein the stator is fastened to the tub only by the plurality of the fastening portions.

45. The stator of claim 32, wherein the stator is fastened to the tub only by the plurality of the fastening portions.

46. The stator of claim 16, wherein the at least one fastening projection pushes the cylindrical sleeve in a radial direction to prevent the cylindrical sleeve from escaping out of the fastening hole.

47. The stator of claim 32, wherein the at least one fastening projection pushes the cylindrical sleeve in a radial direction to prevent the cylindrical sleeve from escaping out of the fastening hole.

\* \* \* \* \*